UNITED STATES PATENT OFFICE.

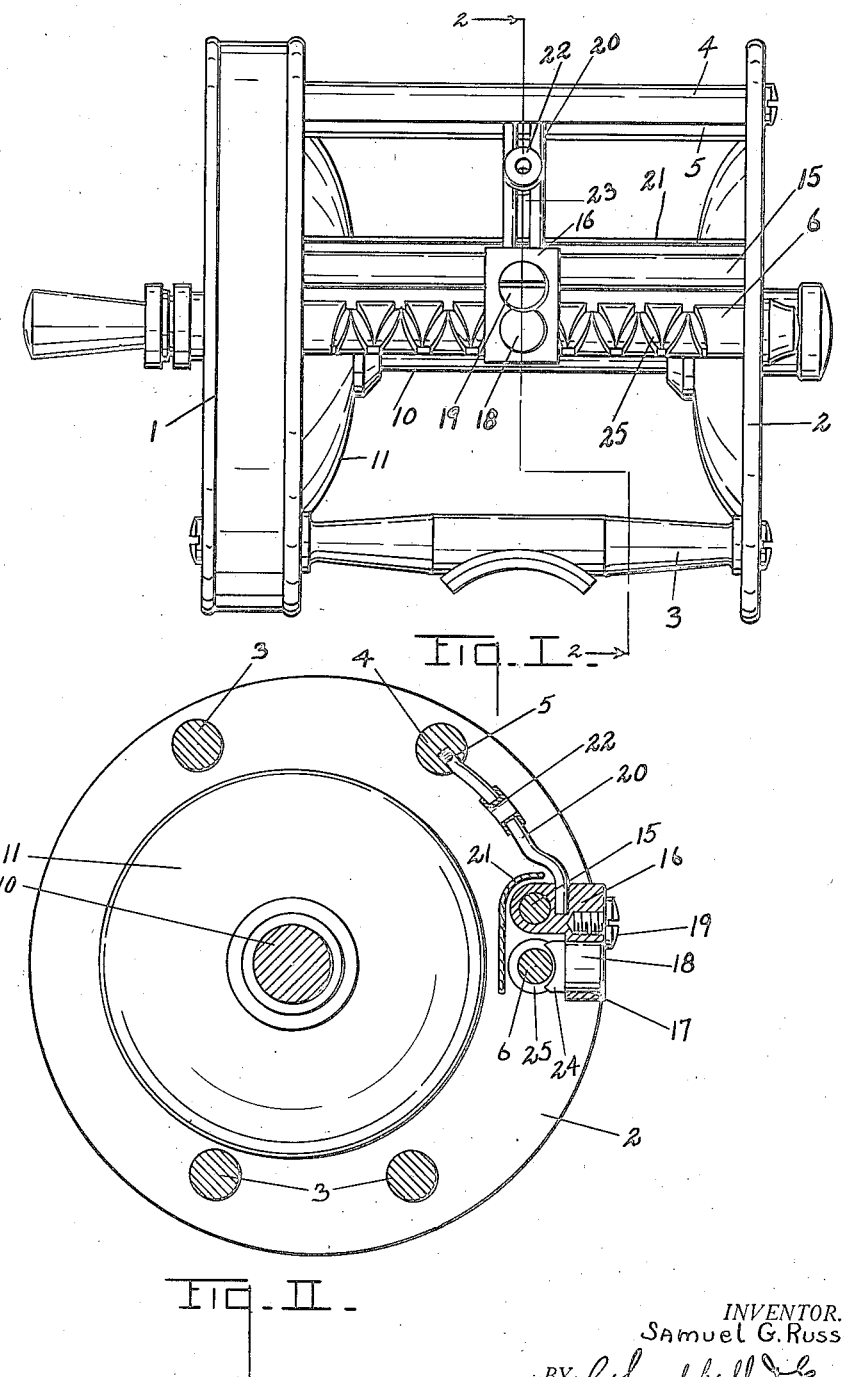

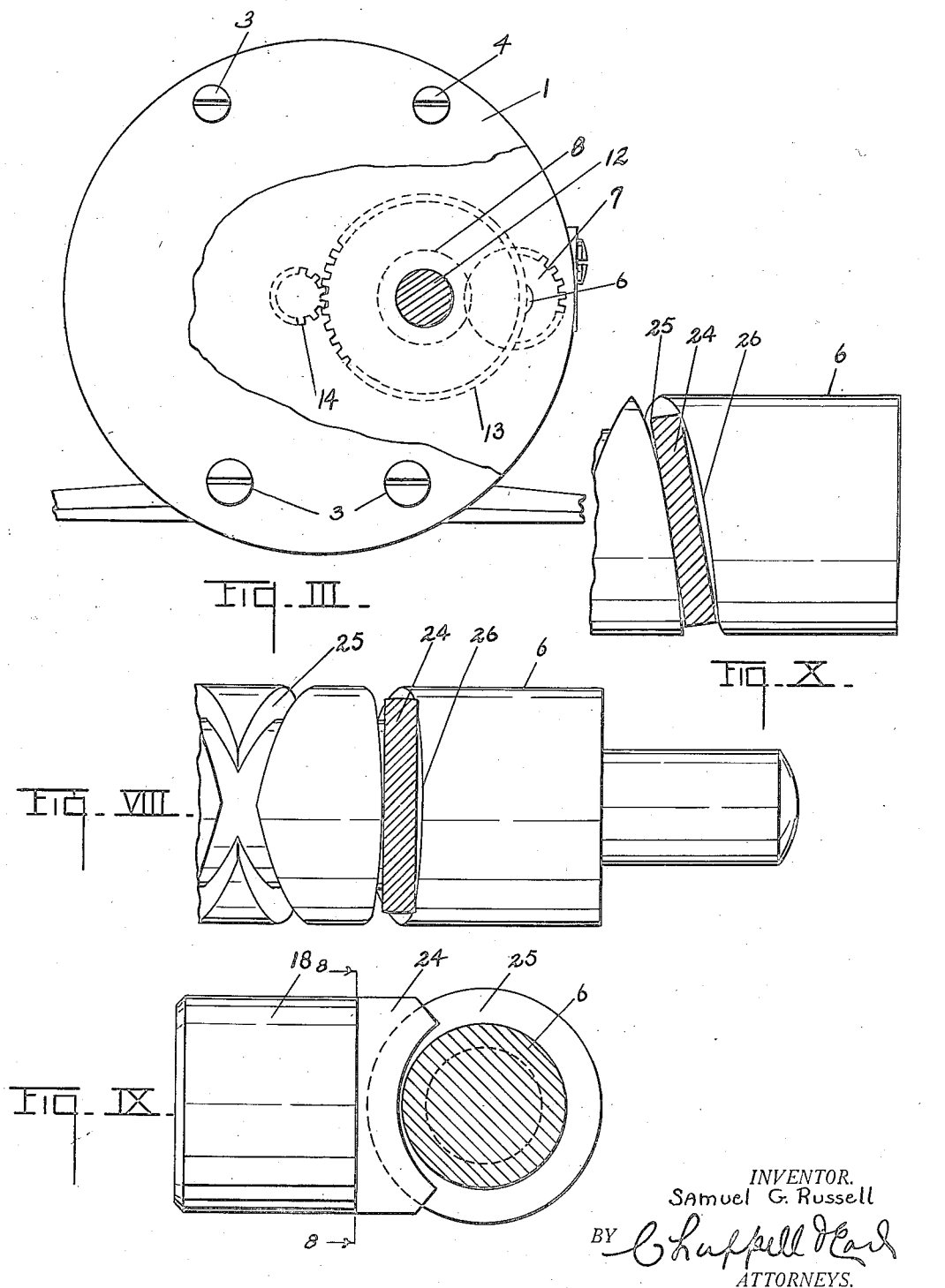

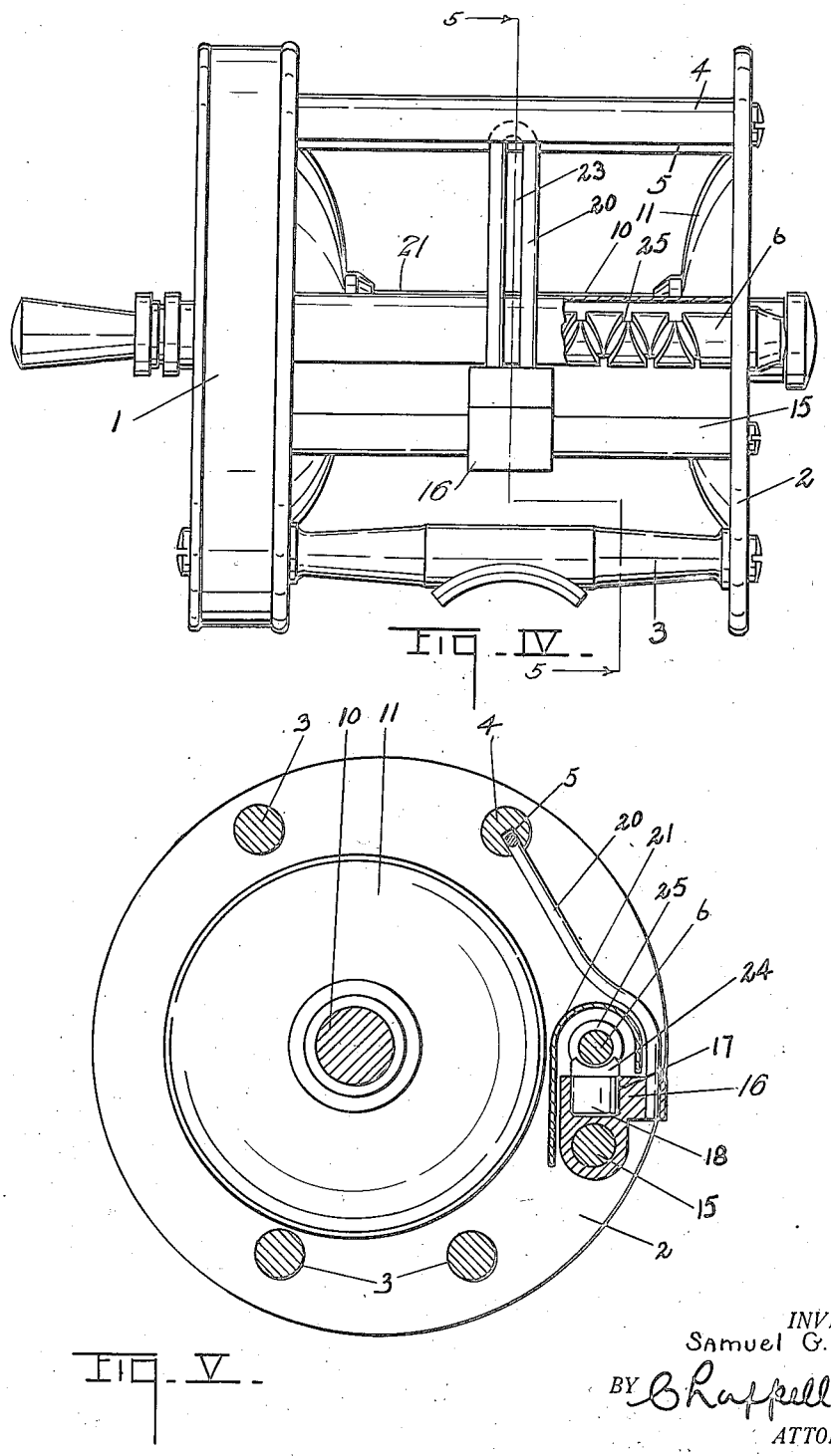

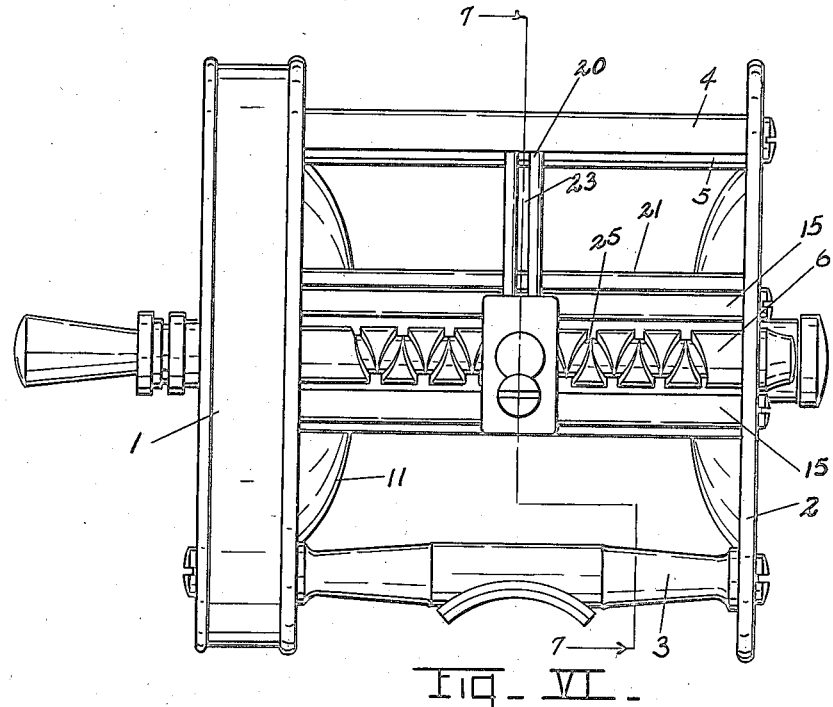
FIG. VI.
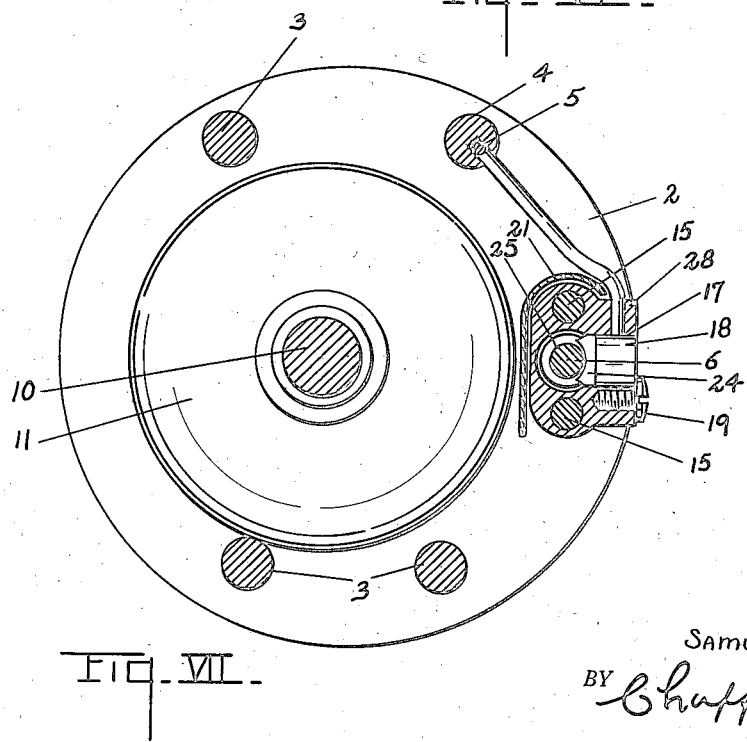
FIG. VII.
INVENTOR.
Samuel G. Russell
BY Chappell & Earl
ATTORNEYS.

SAMUEL G. RUSSELL, OF KALAMAZOO, MICHIGAN, ASSIGNOR TO THE SHAKESPEARE COMPANY, OF KALAMAZOO, MICHIGAN.

FISHING REEL.

1,425,141. Specification of Letters Patent. Patented Aug. 8, 1922.

Application filed April 21, 1921. Serial No. 463,322.

*To all whom it may concern:*

Be it known that I, SAMUEL G. RUSSELL, a citizen of the United States, residing at the city and county of Kalamazoo, State of Michigan, have invented certain new and useful improvements in Fishing Reels, of which the following is a specification.

This invention relates to improvements in fishing reels.

The main objects of this invention are:

First, to provide an improved fishing reel of the level wind type in which the line guide carriage is mounted to move very freely and without binding; also to provide an improved fishing reel which is economical in its parts.

Second, to provide an improved fishing reel of the level wind type which is very durable and not likely to get out of repair.

Third, to provide an improved fishing reel of the level wind type in which the wear on the parts is minimized.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which—

Fig. I is a side elevation of my improved fishing reel.

Fig. II is a transverse section on a line corresponding to the broken line 2—2 of Fig. I.

Fig. III is an end view looking from the left of Fig. I with parts broken away to show the arrangement of the gears, the gears being shown conventionally.

Fig. IV is a side elevation of a modified form of my invention, the modification being mainly in the arrangement of the pawl in the carriage.

Fig. V is a transverse section on a line corresponding to the broken line 5—5 of Fig. IV.

Fig. VI is a side elevation of another embodiment of my improvement, there being a pair of carriage slide rods instead of a single rod as shown in the embodiment of Fig. I.

Fig. VII is a transverse section on a line corresponding to the broken line 7—7 of Fig. VI.

Fig. VIII is an enlarged detail of the traversing shaft, the driving pawl being shown in section on line 8—8 of Fig. IX.

Fig. IX is a detail view showing the relation of the pawl to the traversing shaft, the mounting being shown in transverse section.

Fig. X is a detail view similar to Fig. 8, showing the pawl traveling in a lead portion of the shaft groove.

In the drawings similar reference characters refer to similar parts throughout the several views, and the sectional views are taken looking in the direction of the little arrows at the ends of the section lines.

Referring to the drawing, 1 represents the chambered head of the reel and 2 the tail plate thereof. These head and tail plates are the end members of the frame and are connected by the usual pillars 3 and 4. The pillar 4 is longitudinally slotted at 5 for a purpose which will hereinafter appear. The traversing screw or reversely threaded shaft 6 is journaled in the frame end members and is provided with a pinion 7 meshing with a pinion 8 which is integral with or rigidly mounted upon gear 13 which in turn meshes with pinion 14 on the spool shaft 10. The details of this driving means form no part of this invention.

I arrange a carriage slide rod 15 parallel to the traversing shaft, the line guide carriage 16 being slidably mounted on this rod. The carriage is provided with a pawl socket 17 which, in the embodiment shown in Figs. I, II, VI and VII, is open at the outer end so that the pawl 18 may be inserted and removed from the outer end of the socket. The screw 19 is tapped into the carriage to overhand or overlap the pawl socket, thereby retaining the pawl therein.

Line guide member 20 projects upwardly from the carriage, the same being preferably formed of a loop of wire, its bight end being slidably supported in the groove 5 of the pillar 4. The housing 21 is disposed between the spool and the carriage and slide rod, the upper end of the housing or shield projecting outwardly over the slide rod or over the carriage sliding thereon.

I preferably provide a line guide eye 22 slidable in the slot 23 of the line guide member so that as the diameter of the line body varies upon the reel the eye may travel up and down in the slot and also is free to travel up or down as the line is paid out or reeled in.

The engaging portion 24 of the pawl 18 has flat parallel sides as shown in Figs. VIII, IX and X. The lead portions 25 of the reversing screw groove have parallel sides, that is, the sides of the grooves are in parallel planes so that when the pawl is traveling therein its sides are a sliding fit throughout the width of the pawl. It has been common practice in pawls of this type to curve the sides of the engaging parts of the pawls so that there is a very restricted bearing surface. To permit the reversing of this flat sided pawl the pitch of the groove is lessened at the reversing point, as at 26, allowing the swinging of the pawl. As there is no feeding load on the pawl at this point the fact that the pawl engages only at the center at one side and at its ends on the other is not objectionable.

In the modification shown in Figs. IV and V the pawl carriage 16 is provided with an upwardly facing pawl socket 18 disposed between the traversing shaft 6 and the carriage slide rod 15. This structure is effective when assembled but is not so easily assembled as the structure illustrated in Figs. I and II.

The line guide eye 22 is omitted from this structure, the line traveling in the slot 23 of the line guide member 20.

In the embodiment shown in Figs. VI and VII I provide a pair of the line guide rods 15, the rods being disposed one on each side of the traversing shaft 6. The carriage 28 in this structure is adapted to embrace the traversing shaft but has no bearing engagement therewith, the carriage being entirely supported by the slide rods 15.

My improved fishing reel is simple in its parts. The parts are easily assembled and the carriage moves freely and with little friction and does not bind or become wedged at any point in its travel. It will be understood that it is highly important in a fishing reel that all of its parts shall move freely and without catching or binding at any point, and this I have accomplished by my improvements.

Having thus described my invention, what I claim as new and desire to secure by Letters Patent, is:

1. In a fishing reel, the combination of a frame, a spool, a traversing shaft, a carriage slide rod disposed adjacent and parallel to said traversing shaft, a line guide carriage slidable on said rod and provided with a pawl socket open at its outer end, a pawl disposed in said socket to coact with said shaft, a screw tapped into said carriage to overhang said pawl whereby the pawl is retained in the socket, a housing for said traversing shaft and carriage slide rod arranged at the inner side thereof and having a top portion overhanging the same, a line guide member on said carriage projecting upwardly at the front of said housing, and a grooved pillar adapted to receive the upper end of said line guide member.

2. In a fishing reel, the combination of a frame, a spool, a traversing shaft, a carriage slide rod disposed adjacent and parallel to said traversing shaft, a line guide carriage slidable on said rod and provided with a pawl socket, a pawl disposed in said socket to coact with said shaft, a housing for said traversing shaft and carriage slide rod arranged at the inner side thereof and having a top portion overhanging the same, a line guide member on said carriage projecting upwardly at the front of said housing, and a grooved pillar adapted to receive the upper end of said line guide member.

3. In a fishing reel, the combination of a frame, a spool, a traversing shaft, a carriage slide rod disposed adjacent and parallel to said traversing shaft, a line guide carriage slidable on said rod and provided with a pawl socket open at its outer end, a pawl disposed in said socket to coact with said shaft, a screw tapped into said carriage to overhang said pawl whereby the pawl is retained in the socket, a housing for said traversing shaft and carriage slide rod arranged at the inner side thereof and having a top portion overhanging the same, and a line guide member on said carriage projecting upwardly at the front of said housing.

4. In a fishing reel, the combination of a frame, a spool, a traversing shaft, a carriage slide rod disposed adjacent and parallel to said traversing shaft, a line guide carriage slidable on said rod and provided with a pawl socket, a pawl disposed in said socket to coact with said shaft, a housing for said traversing shaft and carriage slide rod arranged at the inner side thereof and having a top portion overhanging the same, and a line guide member on said carriage projecting upwardly at the front of said housing.

5. In a fishing rod, the combination of a frame, a spool, a traversing shaft, a carriage slide rod disposed adjacent and parallel to said traversing shaft, a line guide carriage slidable on said rod and provided with a pawl socket open at its outer end, a pawl disposed in said socket to coact with said shaft, a screw tapped into said carriage to overhang said pawl whereby the pawl is retained in the socket, and a line guide member on said carriage.

6. In a fishing reel, the combination of a frame, a spool, a traversing shaft, a carriage slide rod disposed adjacent and parallel to said traversing shaft, a line guide carriage slidable on said rod and provided with a pawl socket open at its outer end, a pawl disposed in said socket to coact with said shaft, means for retaining said pawl in said socket, and a line guide member on said carriage.

7. In a fishing reel, the combination of a frame, a spool, a traversing shaft, a carriage slide rod disposed adjacent and parallel to said traversing shaft, a line guide carriage slidable on said rod and provided with a pawl socket, a pawl disposed in said socket to coact with said shaft, said carriage being entirely independent of said shaft except as connected thereto by said pawl, a housing for said traversing shaft and carriage slide rod arranged at the inner side thereof and having a top portion overhanging the same, a line guide member on said carriage projecting upwardly at the front of said housing, and a grooved pillar adapted to receive the upper end of said line guide member.

8. In a fishing reel, the combination of a frame, a spool, a traversing shaft, a carriage slide rod disposed adjacent and parallel to said traversing shaft, a line guide carriage slidable on said rod and provided with a pawl socket, a pawl disposed in said socket to coact with said shaft, said carriage being entirely independent of said shaft except as connected thereto by said pawl, a line guide member on said carriage, and a grooved pillar adapted to receive the upper end of said line guide member.

9. In a fishing reel, the combination of a frame, a spool, a traversing shaft, a carriage slide rod disposed adjacent and parallel to said traversing shaft, a line guide carriage slidable on said rod and provided with a pawl socket, a pawl disposed in said socket to coact with said shaft, said carriage being entirely independent of said shaft except as connected thereto by said pawl, a housing for said traversing shaft and carriage slide rod arranged at the inner side thereof and having a top portion overhanging the same, and a line guide member on said carriage projecting upwardly at the front of said housing.

In witness whereof, I have hereunto set my hand and seal in the presence of two witnesses.

SAMUEL G. RUSSELL. [L. S.]

Witnesses:
LUELLA G. GREENFIELD,
MARGARET L. GLASGOW.